(12) United States Patent
Ruf et al.

(10) Patent No.: US 12,195,222 B2
(45) Date of Patent: Jan. 14, 2025

(54) METHOD AND PACKAGING MACHINE FOR PRODUCING AND CHECKING BLISTER PACKS

(71) Applicant: Uhlmann Pac-Systeme GmbH & Co. KG, Laupheim (DE)

(72) Inventors: Andreas Ruf, Laupheim (DE); Stefan Haaga, Laupheim (DE); Jochen Miller, Laupheim (DE); Joerg Riekenbrauck, Laupheim (DE)

(73) Assignee: UHLMANN PAC-SYSTEME GMBH & CO. KG, Laupheim (DE)

( * ) Notice: Subject to any disclaimer, the term of this patent is extended or adjusted under 35 U.S.C. 154(b) by 0 days.

(21) Appl. No.: 18/202,381

(22) Filed: May 26, 2023

(65) Prior Publication Data
US 2023/0382585 A1 Nov. 30, 2023

(30) Foreign Application Priority Data
May 30, 2022 (EP) .................................... 22176050

(51) Int. Cl.
*B65B 57/10* (2006.01)
*B65B 11/52* (2006.01)
*B65B 61/04* (2006.01)

(52) U.S. Cl.
CPC .............. *B65B 57/10* (2013.01); *B65B 11/52* (2013.01); *B65B 61/04* (2013.01)

(58) Field of Classification Search
CPC ......... B65B 61/04; B65B 11/52; B65B 57/10; B65B 57/04; B65B 9/045; G01N 2021/845; G01N 21/8901; G01N 21/9508
See application file for complete search history.

(56) References Cited

U.S. PATENT DOCUMENTS

| | | | | |
|---|---|---|---|---|
| 5,363,968 A | * | 11/1994 | Soloman | G01N 21/9508 209/939 |
| 5,515,159 A | * | 5/1996 | Sites | G01N 21/9515 348/92 |
| 5,555,707 A | * | 9/1996 | Schwenger | B65B 57/16 53/493 |
| 5,943,436 A | * | 8/1999 | Ebel | B65B 25/008 382/224 |
| 6,687,622 B2 | * | 2/2004 | Parker | G01M 3/36 53/425 |
| 2001/0016059 A1 | * | 8/2001 | Krahn | G01N 21/9508 382/141 |

(Continued)

FOREIGN PATENT DOCUMENTS

| | | |
|---|---|---|
| CN | 213633191 U | 7/2021 |
| EP | 2951563 A1 | 12/2015 |
| JP | S63163259 A | 7/1988 |

(Continued)

OTHER PUBLICATIONS

European Search Report dated Nov. 16, 2022.

*Primary Examiner* — Thomas M Wittenschlaeger
*Assistant Examiner* — Himchan Song
(74) *Attorney, Agent, or Firm* — Dickinson Wright PLLC (57) ABSTRACT

A packaging machine for producing blister packs has an inspection device with at least one detection device configured to optically detect individual blister packs. The upper side and the lower side of each blister pack is inspected by means of the at least one optical detection device.

5 Claims, 2 Drawing Sheets

(56) References Cited

U.S. PATENT DOCUMENTS

2007/0296963 A1\* 12/2007 Parker ................ G01N 21/9508
　　　　　　　　　　　　　　　　　　356/240.1
2018/0319519 A1\* 11/2018 Stange .................... A61J 1/035

FOREIGN PATENT DOCUMENTS

| JP | 2009276102 A | 11/2009 |
| JP | 2022040949 A | 3/2022 |

\* cited by examiner

METHOD AND PACKAGING MACHINE FOR PRODUCING AND CHECKING BLISTER PACKS

CROSS-REFERENCE TO RELATED APPLICATIONS

This application claims the benefit of and priority under 35 U.S.C. § 119 to European Patent Application No. 22 176 050.7, filed May 30, 2022, the contents of which is incorporated herein by reference in its entirety.

FIELD

The present disclosure relates to a packaging machine for producing blister packs and a method for producing blister packs by means of such a packaging machine and for checking the blister packs in the packaging machine.

BACKGROUND

A blister pack usually comprises at least one blister cup for receiving a product, the at least one blister cup being formed in a forming film. The at least one blister cup can be closed by means of a covering film which is usually sealed onto the forming film. Production of blister packs of this kind involves, for example, the steps of forming a plurality of blister cups into a forming film web, filling each blister cup with at least one product, sealing a covering film web onto the forming film web, and stamping out individual blister packs from a composite film web made up of the forming film web and the covering film web.

Blister packs are frequently used for packaging medical or pharmaceutical products, foodstuffs and food supplements. Both the packaged products and the blister packs are subject to rigorous quality standards.

It is known in the art, for example, to check the products to be packaged for their integrity and to detect their color, geometric properties or their composition during or after the filling process in order to ensure that only the correct products are packaged in an undamaged state. Moreover, it is known in the art to determine, after filling, whether each blister cup contains a product, so that only completely filled blister packs are further processed. In order to meet the high quality standards, it may be desirable, however, for the blister packs to be checked as comprehensively as possible, rather than simply determining that they are correctly filled.

SUMMARY

It is an object of the present disclosure to provide a packaging machine and a method for producing blister packs, which allow comprehensive inspection of blister packs in a space-saving and cost-effective manner.

According to an aspect of the present disclosure, a packaging machine comprises a separating device for separating individual blister packs from a forming film web, wherein each blister pack comprises at least one blister cup formed in the forming film, said at least one blister cup preferably being closed by a covering film. The packaging machine further comprises an inspection device comprising at least one detection device which is configured to optically detect individual blister packs, wherein the inspection device is configured to optically detect the blister packs by means of the at least one detection device, both from an upper side and from a lower side, in a checking area. Furthermore, the packaging machine comprises a transport device for moving the blister pack in a transport direction through the inspection device.

In this way, the inspection device, which is arranged behind the separating device in the packaging machine, can be integrated in the packaging machine in a space-saving manner and by detecting both the upper side and the lower side, in particular the entire upper side and the entire lower side, of the blister packs, it allows comprehensive inspection of the blister packs at the same time.

The packaging machine preferably further comprises a forming device for forming the blister cups in the forming film web. In general, blister cups are a depression or cavity in the forming film web which is configured to receive at least one product. The size and shape of the blister cups can be selected at random, in particular taking account of the size and shape of the at least one product, and is not limited to given sizes and shapes. The forming film web may be made from a thermoplastic material, wherein the blister cups are then formed by thermoforming. The packaging machine in this case may comprise a heating device for heating the forming film web, the heating device being provided upstream of the forming device.

The packaging machine preferably further comprises a filling device for filing each blister cup with at least one product. The products are preferably medical or pharmaceutical products, foodstuffs or food supplements which may be available in the form of tablets, capsules, sugar-coated pills, or similar. However, the products may also be pre-packaged liquid products, such as flasks, vials, syringes, and the like, for example.

Each blister cup is preferably closed by a covering film which is connected to the forming film. This is particularly advantageous in the case of products such as tablets, capsules, sugar-coated pills, and the like. For this purpose, the packaging machine may comprise a sealing device for sealing a covering film web onto the forming film web. For other products, such as flasks, vials, syringes, and the like, a covering film need not necessarily be provided. In this case, the blister packs may also have a cover or be packaged without a cover in a secondary packaging.

After connecting, in particular after sealing, the forming film web and the covering film web form a composite film web. The separating device is then configured to separate individual blister packs from the composite film web. The separating device is preferably formed by a stamping device for stamping out individual blister packs from the forming film web or from the composite film web. The forming device, the filling device, and the sealing device are preferably arranged in the packaging machine in this order upstream of the separating or stamping device.

The transport device may be configured to move the blister packs on a transport plane in the transport direction. In this case, the upper side of each blister pack faces upwards in relation to the transport plane and the lower side of each blister pack faces downwards in relation to the transport plane. A circumferential edge of each blister pack is preferably arranged on a plane parallel to the transport plane. In a preferred embodiment, the upper side of each blister pack is formed by the covering film and the lower side of each blister pack is formed by the forming film, wherein a reverse arrangement is also conceivable.

The at least one optical detection device is preferably configured to completely detect at least one blister pack, in particular to completely detect the entire upper side, the entire lower side, and the circumferential edge of each blister pack. The inspection device and the transport device are therefore preferably designed in such a manner that they completely expose the at least one blister pack in the checking area, in other words do not conceal it. In this way, the at least one detection device can completely detect the at least one blister pack, so that it can be comprehensively checked.

The inspection device is preferably configured to check at least the stamping quality of each blister pack. In particular, the inspection device may be configured to check at least one of a length of the blister pack, a width of the blister pack, an edge length of longitudinal and/or transverse edges of the blister pack, a radius between the longitudinal and transverse edges of the blister pack, a position of at least one blister cup of the blister pack with respect to a longitudinal and/or transverse edge, or a combination thereof. In addition, the inspection device may be configured to check a contour of the blister pack, a position of a perforation of the blister pack, an embossment, an inscription, a filling of the blister cups, or a combination thereof. For this purpose, the inspection device preferably comprises a data-processing device, as described in greater detail below, which processes image data detected by the at least one detection device and to determine the required variables based on the processed image date.

The at least one detection device is configured to optically detect the blister packs, e.g. by capturing optical data, such as image data, and can therefore also be referred to as an optical detection device. In general, the at least one detection device may be an optical sensor, in particular for image acquisition, such as a camera, for example.

In one embodiment, the inspection device comprises precisely one detection device, which is arranged above or below the transport device, and reflection means, such as mirrors and/or prisms or the like. The detection device may directly detect the side of the blister packs facing the detection device. The reflection means are arranged and formed in such a manner that the detection device can also optically detect the side of the blister packs facing away from the detection device by means of the reflection means.

In another embodiment, the inspection device comprises a plurality of detection devices, wherein the plurality of detection devices comprises at least a first detection device and a second detection device. The first detection device may be configured to optically detect the upper side of the blister packs and the second detection device may be configured to optically detect the lower side of the blister packs, or vice versa. Therefore, the first detection device is preferably arranged above the transport device and the second detection device is preferably arranged below the transport device. This allows a simple and space-saving setup of the inspection device. In addition, both the upper side and the lower side of the blister packs can be directly and reliably detected by the respective detection device.

The at least one detection device previously described may be the first detection device, the second detection device or another detection device of the plurality of detection devices. In principle, the features described herein in relation to the at least one detection device apply both to the first and the second detection device, and vice versa.

The first and the second detection device are preferably configured to detect the upper side and the lower side of the at least one blister pack simultaneously or sequentially. Preferably, the upper side and the lower side of the at least one blister pack are detected with the blister pack in the same position.

The first and the second detection devices may be arranged above one another, wherein the transport device passes through between the first and the second detection devices. In particular, the first and the second detection devices are arranged above one another in a direction perpendicular to the transport plane and to the transport direction. Consequently, the blister packs may be conveyed through between the first and the second detection devices by means of the transport device. The checking area can be arranged between the first and the second detection devices. In this way, it easily possible for the upper side and the lower side of each blister pack to be detected simultaneously. At the same time, a space-saving setup of the inspection device in a direction parallel to the transport direction is possible.

In order to detect the upper side and the lower side of the at least one blister pack in its entirety, it is furthermore advantageous for the inspection device to comprise a transparent support device arranged in the checking area, on which the at least one blister pack to be detected by the at least one detection device is arranged in the checking area. The at least one detection device, in particular the second detection device, may be arranged below the support device and may completely detect the lower side of the at least one blister pack through the transparent support device. In general, the support device may be designed as a disc or plate made of glass or plastic, for example. The dimensions of the support device in a plane parallel to the transport device are at least as large as, and preferably larger than, the dimensions of a blister pack in this plane, so that the at least one blister pack arranged in the checking area can be detected in its entirety. For example, the support device may be provided in a conveyor table, on which the blister packs are moved by the transport device.

The support device furthermore offers the advantage that the at least one blister pack is arranged on the support device in the checking area and is therefore supported, i.e. carried, by said support device. Consequently, in the checking area, there is no need to hold the at least one blister pack by the transport device, in turn allowing said at least one blister pack to be released by the transport device, so that the circumferential edge of the blister pack is completely exposed.

The transport device preferably extends along the support device and, more preferably, along an upper surface of the support device. The transport device may therefore be configured to move the at least one blister pack into the checking area and to release the at least one blister pack in the checking area, at least briefly.

The transport device preferably comprises at least one traction means which comprises an upper strand and a lower strand arranged spaced apart from one another in a direction perpendicular to the transport plane. The upper strand and the lower strand preferably extend in a direction parallel to the transport plane, more preferably parallel to the transport direction. The at least one traction means may be an endless traction means formed, for example, by a belt, in particular a toothed or V-ribbed belt, or a chain. The at least one traction means may be driven by a corresponding drive.

A particularly space-saving setup of the inspection device or of the packaging machine may by facilitated in that the at least one detection device, preferably the second detection device, is arranged between the upper strand and the lower strand of the at least one traction means. In this case, it is sufficient for the at least one detection device to be arranged at a height which lies between the height of the upper strand and the height of the lower strand. It is however not necessary for the at least one detection device to be partially or completely received between the upper strand and the lower strand of the traction means, as becomes particularly clear from the following description of the transport device.

In a preferred embodiment, the transport device comprises a plurality of receptacles which are arranged one behind the other in the transport direction. Each receptacle may receive at least one blister pack. Preferably, exactly one blister pack is received in each receptacle in a direction parallel to the transport direction. If desired, multiple blister packs can be arranged next to each another in a direction perpendicular to the transport direction and parallel to the transport plane. The transport device may therefore be configured to move a row of blister packs, or multiple rows of blister packs which are arranged behind one another in a direction parallel to the transport direction, through the inspection device.

Each of the plurality of receptacles may be adjustable between a first state, in which it holds the at least one blister pack, and a second state, in which it releases the at least one blister pack. For example, the receptacles are configured to hold blister packs in a form-fitting or force-fitting manner, for example by clamping the blister packs in the respective receptacle. In order to release the blister packs for a comprehensive check in the checking area, as mentioned above, in the checking area, each receptacle of the plurality of receptacles is arranged in the second state. In other words, in the checking area, the receptacles are at least temporarily arranged in the second state. In the checking area, the receptacles may be adjusted between the first and second states. In this way, when the receptacles are in the first state, blister packs can be moved into the checking area and out of the checking area. In the second state, the at least one detection device can optically detect the at least one blister pack.

In general, the transport device may be designed in different ways. For example, the transport device may comprise slides which are movable in the transport direction, each slide having a receptacle for at least one blister pack. In addition or alternatively, the transport device may comprise suction devices which each engage with at least one blister pack, or may comprise a gripping mechanism for gripping at least one blister pack.

The transport device preferably comprises a plurality of receiving elements arranged behind each other in a direction parallel to the transport direction. A pair of a leading receiving element and a trailing receiving element of the plurality of receiving elements forms one receptacle of the plurality of receptacles for at least one blister pack. Each pair of adjacent receiving elements may thus form one receptacle of the plurality of receptacles.

In this way, the transport device and in particular the receiving elements rest against a front edge and a rear edge of the at least one blister pack and, therefore, do not cover, or do not substantially cover, the upper side and the lower side of the blister pack. In contrast with suction or gripping devices. In general, the plurality of receiving elements may be designed in such a manner that the blister packs are held in the receptacles in a form-fitting manner in the transport direction. Moreover, the transport device can easily be formed in such a manner that, in the checking area, the upper side, the lower side, and the circumferential edge of the blister packs are not concealed by the transport device or components thereof.

It is preferable for the leading receiving element and the trailing receiving element of each pair of receiving elements to be movable with respect to one another in a direction parallel to the transport direction, in order to open and close the receptacles. In this way, the transport device can receive the blister packs in a simple and unobstructed manner, and can at the same time transport them safely. In an opened first position of the leading and the trailing receiving elements, a distance between the leading receiving element and the trailing receiving element parallel to the transport direction is larger than in a closed second position. In the first position, the distance between the leading and the trailing receiving elements is also greater than a dimension of the blister packs in a direction parallel to the transport direction. The first position of the receiving elements corresponds to the first state of the receptacles and the second position of the receiving elements corresponds to the second state of the receptacles.

The transport device is preferably configured to open the receptacles in the checking area, in order to expose the circumferential edge of the at least one blister pack. For this purpose, the receiving elements are set in the first position and the receptacles are set in the second state, respectively. It is therefore possible for the complete blister pack to be checked on both sides particularly easily.

In an exemplary embodiment, the transport device comprises at least two traction means, more particularly at least a first and a second traction means, which run substantially parallel to one another. The first traction means can be driven by means of a first drive and the second traction means can be driven by means of a second drive.

All leading receiving elements of the plurality of receiving elements can be fixed to the first traction means and all trailing receiving elements of the plurality of receiving elements can be fixed to the second traction means. By means of the first and the second drive, the speed of the first and the second traction means, and therefore of the receiving elements, can be adjusted. If a relative speed between the first and in the second traction means is equal to zero, the distance between the leading receiving elements and the trailing receiving elements remains substantially constant. If a relative speed is generated between the first and the second traction means, the distance between the leading receiving elements and the trailing receiving elements changes accordingly.

The plurality of receiving elements may be designed in the form of rails, bars, pushers, or the like, which are fixed to the traction means. The receiving elements may project beyond the at least one traction means in a direction perpendicular to the transport direction and parallel to the transport plane and form the receptacles for the blister packs laterally alongside the at least one traction means. In this way, the blister packs are not concealed by the at least one traction means in the checking area. In this case, the at least one detection device may be arranged at a height between the upper strand and the lower strand of the at least one traction means but laterally offset.

In order to check the blister packs based on the data generated by the at least one detection device, the inspection device may furthermore comprise a data-processing device for image processing, wherein the data-processing device is connected to the at least one detection device in a communicating manner. The at least one detection device detects image data of the at least one blister pack, which data are processed and evaluated by the data-processing device, in order to obtain the desired information on the blister pack. A particularly cost-effective solution can be achieved when the data-processing device is integrated in a control device of the inspection device or of the packaging machine.

Apart from the control device, the packaging machine preferably further comprises an ejection device for ejecting blister packs from the packaging machine. The control device is connected to the data-processing device in a communicating manner or designed integrally therewith. The ejection device is connected to the control device in a communicating manner. The control device is configured to actuate the ejection device in response to a signal of the data-processing device. Consequently, it is possible for blister packs which do not meet a predefined quality criterion to be ejected by the inspection device based on the check made and thereby to prevent them from being packed further on in the process.

According to another aspect of the present disclosure, a method for producing blister packs by means of a packaging machine and for checking the blister packs in the packaging machine comprises the steps of:

separating individual blister packs from a forming film web, wherein each blister pack comprises at least one blister cup formed in the forming film, which is preferably closed by a covering film;

receiving at least one blister pack of the individual blister packs by a transport device and moving the at least one blister pack into a checking area by means of the transport device;

detecting an upper side and a lower side of the at least one blister pack in the checking area by means of at least one optical detection device;

moving the at least one blister pack out of the checking area by means of the transport device.

In this way, each blister pack can be comprehensively checked immediately after it has been separated, in particular after it has been stamped or cut out, by detecting both the upper side and the lower side of the blister pack, before it leaves the packaging machine and preferably also before it is further processed, for example packed, within the packaging machine.

The method is preferably implemented by means of the packaging machine described herein. All features described in relation to the packaging machine and its components, such as the inspection device and the transport device, therefore relate to the method in an analogous manner, and vice versa. In particular, the functions of the packaging machine and its components as described herein can also be defined as steps of the method.

Unless otherwise described, the steps of the method are carried out in the sequence as indicated.

Each blister cup is preferably closed by the covering film and the blister packs are separated from a composite film web comprising the forming film web and a covering film web. The method may then comprise, prior to the separation, the step of connecting the forming film web and the covering film web, in particular by sealing the covering film web to the forming film web.

In order to allow a comprehensive check of the blister packs, it is preferable for the method to further comprise, prior to detecting the upper side and the lower side of the at least one blister pack, the step of:

releasing the at least one blister pack by the transport device in the checking area, particularly preferably in such a manner that the circumferential edge of the at least one blister pack is exposed and can be detected by the at least one detection device.

The blister packs are preferably received by the transport device in a receiving area, moved by means of the transport device into the checking area, released by the transport device in the checking area, detected by the detection device and once again received by the transport device, moved into a delivery area by means of the transport device and released there by the transport device.

In general, receiving and releasing the blister packs by closing and opening the plurality of receptacles of the transport device can be realized by adjusting said receptacles between the first state and the second state, as described above in relation to the transport device.

More precisely, the transport device comprises the plurality of receiving elements, wherein a pair of a leading receiving element and a trailing receiving element of the plurality of receiving elements forms a receptacle for the at least one blister pack. Receiving and releasing the at least one blister pack comprises the relative movement between the respective leading and the trailing receiving elements of the plurality of receiving elements. When receiving the at least one blister pack, the distance between the leading and the trailing receiving elements becomes smaller, i.e. decreases, and, when releasing the at least one blister pack, the distance between the leading and the trailing receiving element becomes larger, i.e. increases. In this way, the at least one blister pack can be received and reliably moved into the checking area and easily released there for a comprehensive check.

Preferably, the transparent support device is provided in the checking area and the transport device moves the at least one blister pack onto the support device and arranges the at least one blister pack in the checking area on the support device. The at least one detection device, in particular the second detection device, can then optically detect the at least one blister pack through the support device in the checking area. The at least one blister pack on the support device may be released by the transport device, so that the circumferential edge thereof can also be effectively checked, while at the same time the first and the second detection device can optically detect the upper side and the lower side of the blister pack, preferably without further reflection means or the like.

The blister cups are usually formed into the forming film web from above and filled and the covering film web is fed to the forming film web from above and sealed thereon. After separating the individual blister packs, the blister cups thereof are thus oriented downwardly and the upper side is formed by the covering film. This orientation is preferably maintained, in order to allow for a simple structure of the packaging machine. Consequently, in the checking area the forming film, in particular in the region of the blister cups, lies on the support device and the covering film is facing upwards.

In a preferred embodiment, the upper side of the at least one blister pack is detected by means of the first detection device and at the same time the lower side of the at least one blister pack is detected by means of the second detection device. In this way, the accuracy of the check can be increased and a space-saving setup of the inspection device is made possible.

The at least one detection device preferably obtains image data from the upper side and the lower side of the at least one blister pack. In order to obtain information on the quality, in particular the stamping quality, of the blister packs from the image data, the method preferably comprises the steps of processing the image data obtained from the at least one detection device by means of the data-processing device and deriving at least one quality feature of the at least one blister pack based on the image processing. The quality feature may, for example, be a dimension of the blister pack, a position of the at least one blister cup, in particular in relation to the edges of the blister pack, or a filling of the at least one blister cup. Further variables or quality features which can be checked by the inspection device are described above in relation to the inspection device.

The method may be particularly efficient if blister packs of inadequate quality are immediately ejected and are not further processed. The method therefore preferably comprises the steps of ejecting the at least one blister pack if the at least one quality feature does not satisfy a predetermined criterion, and further processing the at least one blister pack if the at least one quality feature satisfies the predetermined criterion. The predetermined criterion may, for example, be a tolerance range within which given dimensions of the blister pack, or a position of the at least one blister cup, are to fall. The predetermined criterion may also be satisfied, for example, when each blister cup is filled with a product.

DETAILED DESCRIPTION

Figure 1:
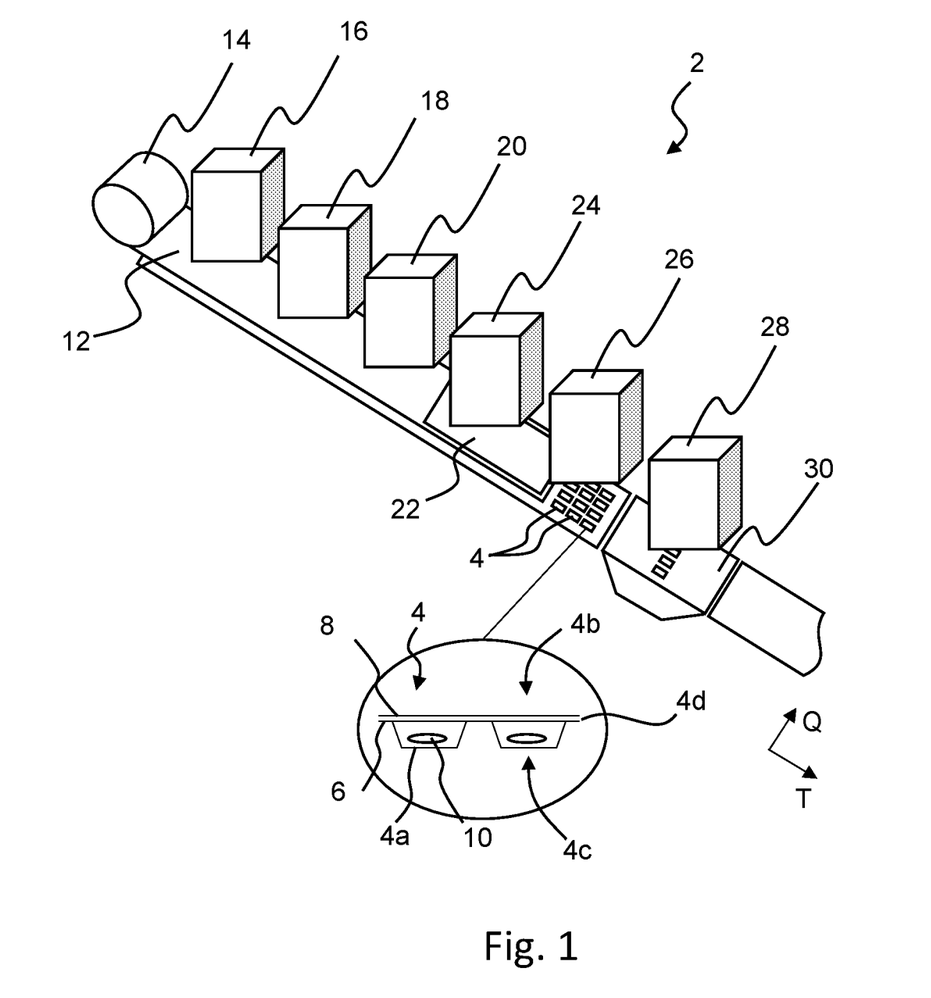
FIG. 1 shows a packaging machine comprising an inspection device in a schematic representation.

A packaging machine 2 for producing blister packs 4 and a detail view of a blister pack 4 are shown schematically in FIG. 1. Each blister pack 4 comprises at least one blister cup 4a formed in a forming film 6, which blister cup 4a is optionally closed by a covering film 8. Due to the production process, an upper side 4b of the blister pack 4 is then usually formed by the covering film 8 and a lower side 4c of the blister pack 4 is usually formed by the forming film 6 having the blister cups 4a. In each blister cup 4a of the blister pack 4, a product 10, in particular a medical or pharmaceutical product, such as a tablet, a capsule, a sugar-coated pill, or the like, is received. However, blister packs 4 are also conceivable which have no covering film 8. For these embodiments, the features described herein in relation to the covering film 8, or the connection thereof to the forming film 6, are to be regarded as optional or moot.

In the embodiment shown in FIG. 1, the packaging machine 2 is designed as a blister machine having a plurality of processing stations or devices, as described below. It is clear, however, that the packaging machine 2 is not limited to a blister machine of this kind.

The forming film 6 may be a thermoplastic film in which the blister cups 4a are formed by thermoforming. The forming film 6 may preferably be provided on a storage roll 14 in the form of a forming film web 12. The packaging machine 2 may comprise a heating device 16 for heating the forming film web 12 and a forming device 18 for forming the blister cups 4a into the forming film web 12. In a filling device 20 of the packaging machine 2, the blister cups 4a can be filled with the products 10. The blister cups 4a can then be closed, preferably by sealing a covering film web 22 to the forming film web 12 in a sealing device 24 of the packaging machine 2. The covering film 8 is therefore supplied in the form of a covering film web 22, preferably likewise provided on a storage roll (not shown), which is fed to the forming film web 12 from above.

The packaging machine 2 furthermore comprises a separating device 26 for separating individual blister packs 4 from the forming foil web 12 and more preferably from a composite film web comprising the forming film web 12 and the covering film web 22. The separating device 26 is preferably designed as a stamping device. After the separating device 26, individual blister packs 4 exist which are then fed to further processing steps by means of a conveying device (not shown), such as pickers, for example. The orientation of the blister packs 4, in particular of the upper side and the lower side 4b, 4c, preferably remains unchanged. It is evident that the blister packs 4 can however be produced in any manner.

The packaging machine 2 further comprises an inspection device 28 for checking the blister packs 4, in particular the individual blister packs 4 after the separating device 26, and also a transport device 30 for moving the blister packs 4 in a transport direction T through the inspection device 28.

Figure 2:
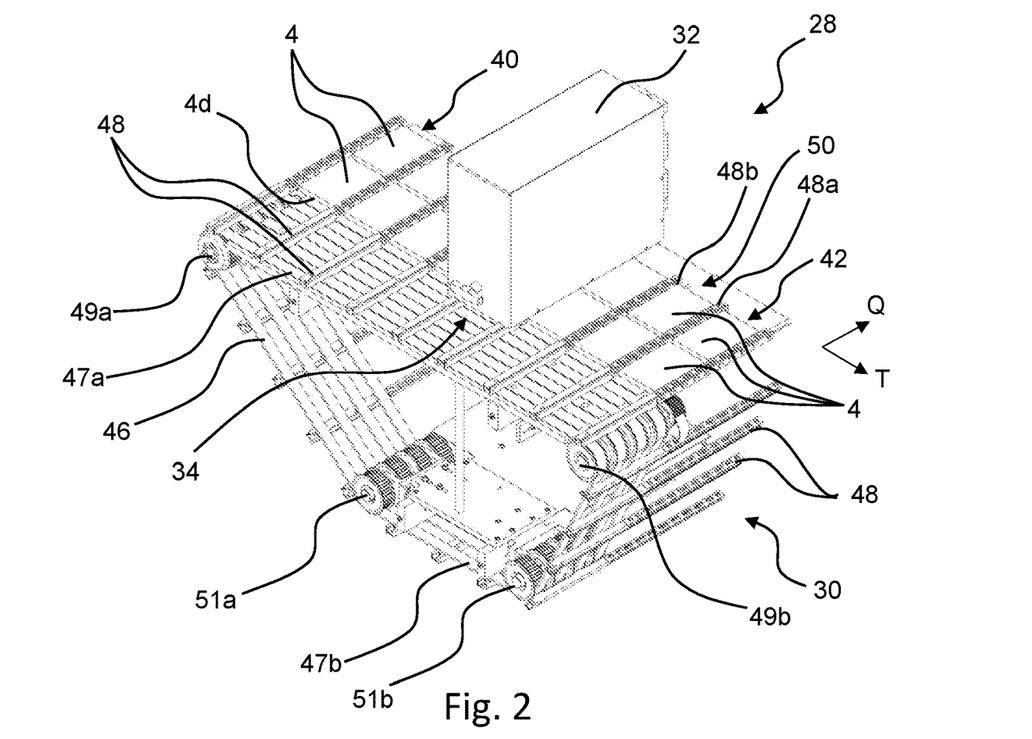
FIG. 2 shows the inspection device of a packaging machine in a perspective view.
Figure 3:
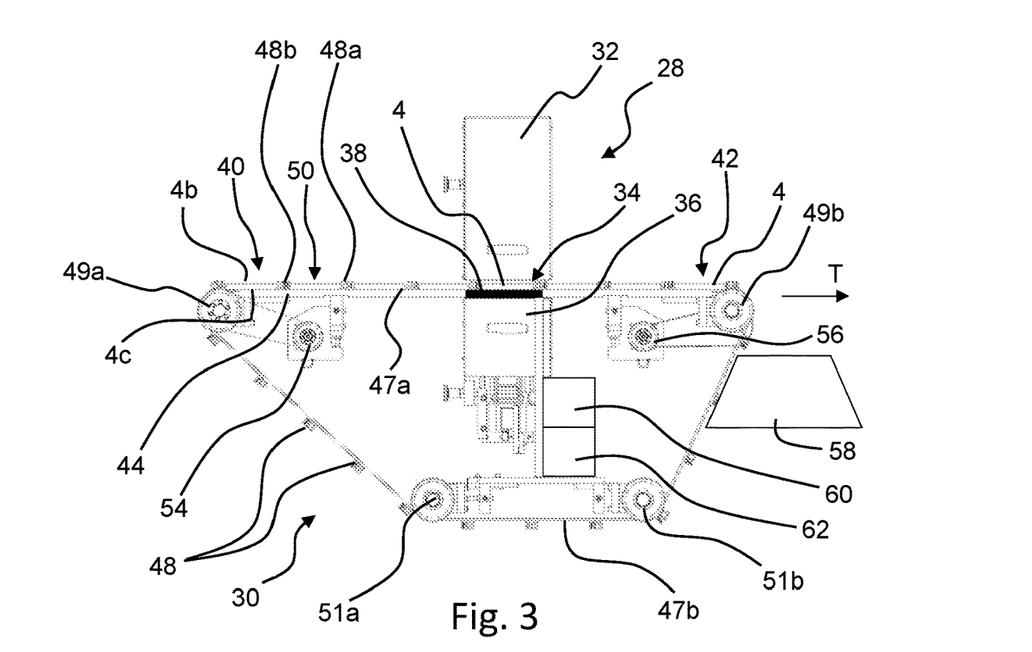
FIG. 3 shows the inspection device of FIG. 2 in a side view.

The inspection device 28 and the transport device 30 are described in greater detail below with reference to FIG. 2 and FIG. 3. The inspection device 28 comprises at least one detection device 32 which is designed to optically detect individual blister packs 4 both from an upper side 4b and from a lower side 4c in a checking area 34 of the packaging machine 2. For this purpose, the inspection device 28 may comprise reflection means, by means of which the detection device 32 can not only detect the upper side 4b facing it, but also the lower side 4c of the blister packs 4. In the preferred embodiment shown, however, the inspection device 28 comprises a plurality of detection devices, more precisely the detection device 32, which is also referred to as the first detection device, and a second detection device 36. Each of the plurality of detection devices 32, 36 may comprise a camera, for example, or any other optical sensor.

Here, the first detection device 32 optically detects the upper side 4b of the blister packs 4 and the second detection device 36 optically detects the lower side 4c of the blister packs 4. It is preferable that the detection devices 32, 36 directly detect the upper side 4a and the lower side 4c of the blister packs 4, which is why the first and the second detection devices 32, 36 are oriented to the upper side 4a and the lower side 4c, respectively. The first detection device 32 may be arranged above the transport device 30 or the checking area 34 for this purpose, and the second detection device 36 may be arranged below the transport device 30 or the checking area 34. It is preferable for the first and the second detection devices 32, 36 to simultaneously detect the blister pack 4, for which purpose the detection devices 32, 36 can be arranged above one another and the transport device 30 passes through between the first and the second detection devices 32, 36. The checking area 34 is therefore arranged between the first and the second detection devices 32, 36. Other assignments or arrangements and further detection devices are generally conceivable.

So that each blister pack 4 can be detected and checked comprehensively, the upper side 4b, the lower side 4c, and a circumferential edge 4b of each blister pack 4 should be exposed as far as possible in the checking area 34, in other words, not concealed. The inspection device 28 therefore preferably comprises a transparent support device 38 in the checking area 34, on which the blister pack 4 to be detected is arranged in the checking area 34. The second detection device 36 may detect the lower side 4c of the blister pack 4 through the transparent support device 38. In addition, the blister pack 4 to be detected in each case may rest on the support device 38 in the checking area 34, so that it does not need be held there by the transport device 30, but can be released by the transport device 30 so that the circumferential edge 4d of the blister pack 4 is released.

The transport device 30 basically moves the blister packs 4 in the transport direction T on a transport plane, wherein the upper side 4b of each blister pack 4 is preferably oriented upwards in relation to the transport plane and the lower side 4c of each blister pack 4 is oriented downwards in relation to the transport plane. The transport device 30 may receive the blister packs 4 in a receiving area 40 of the transport device 30, for example by transferring the blister packs 4 from the separating device 26 to the transport device 30 by means of a suitable transfer device. The transport device 30 can then move the blister packs 4 from the receiving area 40 into the checking area 34 and from the checking area 34 into a delivery area 42, from which it can be delivered to further transport or processing devices. The transport device 30 extends over the support device 34. The support device 34 is provided in a conveyor table 44, for example, on which the blister packs 4 are moved by the transport device 30. The transport device 30 may, in principle, comprise gripping or suction means, in order to hold and move the blister packs 4. Mechanisms of this kind would, however, also conceal the upper side 4b or the lower side 4c of the blister packs 4, at least in part.

The transport device 30 therefore preferably comprises at least one endless first traction means 46, for example in the form of a belt, to which a plurality of receiving elements 48 is attached, which are arranged behind one another in the transport direction T. The receiving elements 48 may have a strip-shaped design. The plurality of receiving elements 48 are provided in pairs, each pair comprising a leading receiving element 48a and a trailing receiving element 48b. Each pair of receiving elements 48a, 48b may then form a receptacle for at least one blister pack 4. The plurality of receiving elements 48 may be designed in such a manner that they do not conceal, or do not substantially conceal, the upper side 4b and the lower side 4c of the blister packs 4. Instead, the receiving elements 48 may only rest against a front edge and a rear edge of the respective blister pack 4, which abut the leading or trailing receiving element 48a, b. In addition, the receiving elements 48 may form the receptacles 50 in such a manner that the blister packs 4 are also not concealed by the at least one traction means 46.

Preferably, exactly one blister pack 4 is received in a receptacle 50 in a direction parallel to the transport direction T. In a direction Q perpendicular to the transport direction T and parallel to the transport plane, a plurality of blister packs 4, in this case two blister packs 4, may be received in each receptacle 50, as can be seen in FIG. 2. In this case, the first and the second detection device 32, 36 can each be configured to optically detect the blister packs 4 arranged alongside one another, or at least one further detection device can be provided above and/or below the checking area 34.

The at least one first traction means 46, preferably all traction means, have an upper strand 47a and a lower strand 47b, which are arranged spaced apart from one another in a direction perpendicular to the transport plane and run parallel to the transport plane. For this purpose, the at least one traction means 46 is guided at least about a first and a second roller 49a, 49b, the axes of which lie in a plane parallel to the transport plane. In the embodiment shown, the at least one traction means 46 is furthermore guided over a third and a fourth roller 51a, 51b, the axes of which lie parallel to the transport plane in a further plane. The upper strand 47a runs between the first and the second rollers 49a, 49b and the lower strand 47b runs between the third and the fourth rollers. In this way, the at least one traction means 46 is spanned in a substantially trapezoidal shape. The upper and the lower strand 47a, b may be arranged spaced so far from one another that the second detection device 36 can be arranged at a level between the upper and the lower strand 47a, 47b of the at least one traction means 46, as shown.

The receiving elements 48 preferably rest against a front and a rear edge of the blister packs 4 during transportation of the blister packs 4 and do not cover, or do not substantially cover, the upper side 4b and the lower side 4c of the blister packs 4. An unimpeded receiving and releasing of the blister packs 4 can be achieved in that the leading receiving element 48a and the trailing receiving element 48b of each pair of receiving elements 48 can be moved relative to one another in a direction parallel to the transport direction T. In this way, the receptacles 50 can be opened and closed and the at least one blister pack 4 can easily be released by the transport device 30 in the checking area 34, so that its circumferential edge can also be detected by the at least one detection device 32, 36.

In the exemplary embodiment shown, the leading receiving elements 48a are connected to the first traction means 46 and the trailing receiving elements 48b are connected to a second traction means 52 of the transport device 30. In order to improve stability, multiple first and multiple second traction means can also be provided, as shown. The first and the second traction means 46, 52 run parallel to one another. The first traction means 46 is driven by a first drive 54 and the second traction means 52 is driven by a second drive 56. A relative speed between the first and the second traction means 46, 52, and therefore between the leading and the trailing receiving elements 48a, 48b, can be generated by the first and the second drive 54, 56, in order to open and close the receptacles 50.

In direction Q perpendicular to the transport direction T, the receiving elements 48 preferably extend beyond the traction means 46, 52 and form receptacles for the blister packs 4 laterally alongside the traction means 46, 52. This means that the lower side 4c of the blister packs 4 is not concealed by the traction means 46, 52.

In the receiving area 40, the transport device 30 receives at least one blister pack 4, for which purpose the receptacles 50 are initially adjusted from a first state into an opened second state for insertion of the at least one blister pack 4. Relative movement between the leading receiving element 48a and the trailing receiving element 48b results in the receptacles 50 being adjusted from the second state back into the closed first state, in which the transport device 30 moves the at least one blister pack 4 into the checking area 34. In the checking area 34, the at least one blister pack 4 is preferably released by the transport device 30, so that the circumferential edge 4d of the blister pack 4 is exposed and the blister pack 4 can be optically detected from the upper side 4b and the lower side 4c. The at least one blister pack 4 is released by opening the receptacles 50 into the second state in the checking area 34. After optically detecting the blister pack 4 in the checking area 34, the receptacles 50 are closed again and the at least one blister pack 4 is conveyed from the checking area to the delivery area 42.

From the delivery area 42, the at least one blister pack 4 can be fed on for further processing, such as packing in folding boxes, for example. However, this should only be the case when a desired quality of the blister pack 4 is established during checking the at least one blister pack 4 by the inspection device 28. If the quality of the at least one blister pack 4 is inadequate, the blister pack 4 can be ejected and thereby excluded from further processing. An ejection device 58 is depicted symbolically in FIG. 3. For example, defective blister packs 4 are not engaged by a transfer device which feeds the blister packs 4 from the delivery region 42 for further processing, and they fall into a collection bin. Alternative ejection devices 58 are conceivable.

In order to check the blister packs 4 based on the data generated by the at least one detection device 32, 36, the inspection device 28 preferably comprises a data-processing device 60 which is particularly configured for image processing of the image data detected by the detection devices 32, 36 and is connected in a communicating manner to the at least one detection device 32, 36. The data-processing device 60 processes the image data and evaluates it, in order to obtain the desired information on the quality, in particular the stamping quality, of the blister packs 4. For this purpose, based on the image processing, the data-processing device 60 may derive at least one quality feature of each blister pack and check whether the quality feature satisfies a predetermined criterion, for example falls within a predefined tolerance range. For example, based on images of the upper side and the lower side of the blister packs, by suitable data-processing one or several of the following quality features can be determined: a length of the blister pack 4, a width of the blister pack 4, an edge length of longitudinal and/or transverse edges of the blister pack 4, a radius between the longitudinal and transverse edges of the blister pack 4, a position of at least one blister cup 4a of the blister pack 4 relative to a longitudinal and/or transverse edge, a contour of the blister pack 4, a position of a perforation of the blister pack 4, a embossment, an imprint, a filling of the blister cups 4a, or a combination thereof.

The inspection device 28 may furthermore comprise a control device 62 which is connected in a communicating manner to the data-processing device 60 or is integrally formed therewith. In addition, the control device 62 may be connected to the ejection device 58 in a communicating manner, in order to actuate it in response to a signal from the data-processing device 60. If a blister pack 4 does not satisfy the predefined quality criteria, it is immediately ejected based on the check performed by the inspection device 28.

Following stamping, the blister packs 4 can thus be checked comprehensively by means of the packaging machine 2 and the method described herein, in that they are optically detected both from the upper side and from the lower side, wherein the circumferential edge of the blister packs is preferably also exposed. For this purpose, the blister packs can be released in the checking area, at least for a short period. Defective blister packs can be immediately excluded from further processing. Alternative embodiments will be evident to the person skilled in the art, based on the exemplary embodiments described herein.

The invention claimed is:

1. A method for producing blister packs by means of a packaging machine and for checking the blister packs in the packaging machine, the method comprising the steps of:
   separating individual blister packs from a forming film web, wherein each blister pack comprises at least one blister cup formed in the forming film;
   receiving at least one blister pack of the individual blister packs by a transport device and moving the at least one blister pack into a checking area by means of the transport device, wherein a transparent support device is provided in the checking area, and wherein the transport device moves the at least one blister pack onto the support device and arranges the at least one blister pack in the checking area on the support device;
   detecting an upper side and a lower side of the at least one blister pack in the checking area by means of at least one optical detection device, wherein the at least one detection device optically detects the at least one blister pack through the support device in the checking area;
   moving the at least one blister pack out of the checking area by means of the transport device.

2. The method of claim 1, further comprising the following step prior to the step of detecting the upper side and the lower side of the at least one blister pack:
   releasing the at least one blister pack by the transport device in the checking area.

3. The method of claim 2, wherein the transport device comprises a plurality of receiving elements, wherein a pair of a leading receiving element and a trailing receiving element of the plurality of receiving elements forms a receptacle for at least one blister pack; and
   the steps of receiving and releasing the at least one blister pack comprise a relative movement between the respective leading and trailing receiving elements of the plurality of receiving elements, wherein, when receiving the at least one blister pack, the distance between the leading and the trailing receiving elements decreases and, when releasing the at least one blister pack, the distance between the leading and the trailing receiving elements increases.

4. The method of claim 1, wherein a plurality of detection devices is provided and the step of detecting the upper side of the at least one blister pack is performed by means of a first detection device of the plurality of detection devices and, at the same time, the step of detecting the lower side of the at least one blister pack is performed by means of a second detection device of the plurality of detection devices.

5. The method of claim 1, further comprising the steps of:
   processing image data obtained from the at least one detection device by means of a data-processing device and deriving at least one quality feature of the at least one blister pack based on the image processing;
   ejecting the at least one blister pack if the at least one quality feature does not satisfy a predetermined criterion, and
   further processing the at least one blister pack, if the at least one quality feature does satisfy the predetermined criterion.

* * * * *